No. 709,315. Patented Sept. 16, 1902.
J. T. GILMER.
TURPENTINE STILL.
(Application filed June 26, 1901.)
(No Model.) 2 Sheets—Sheet 1.
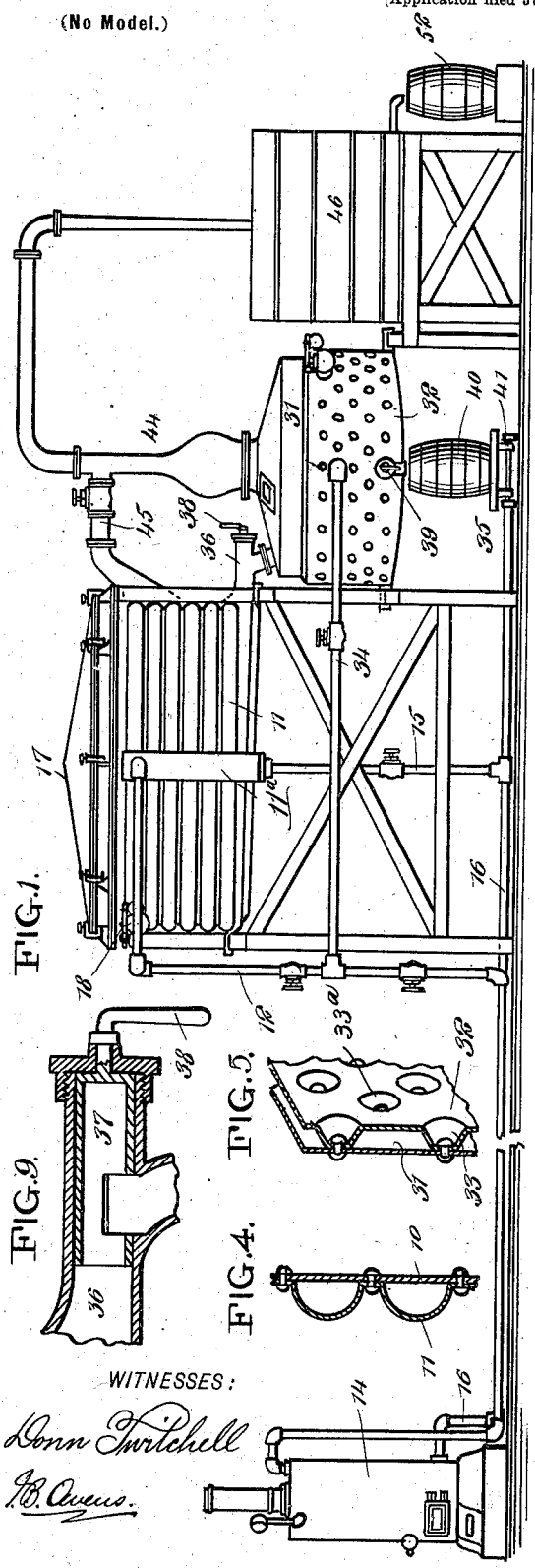
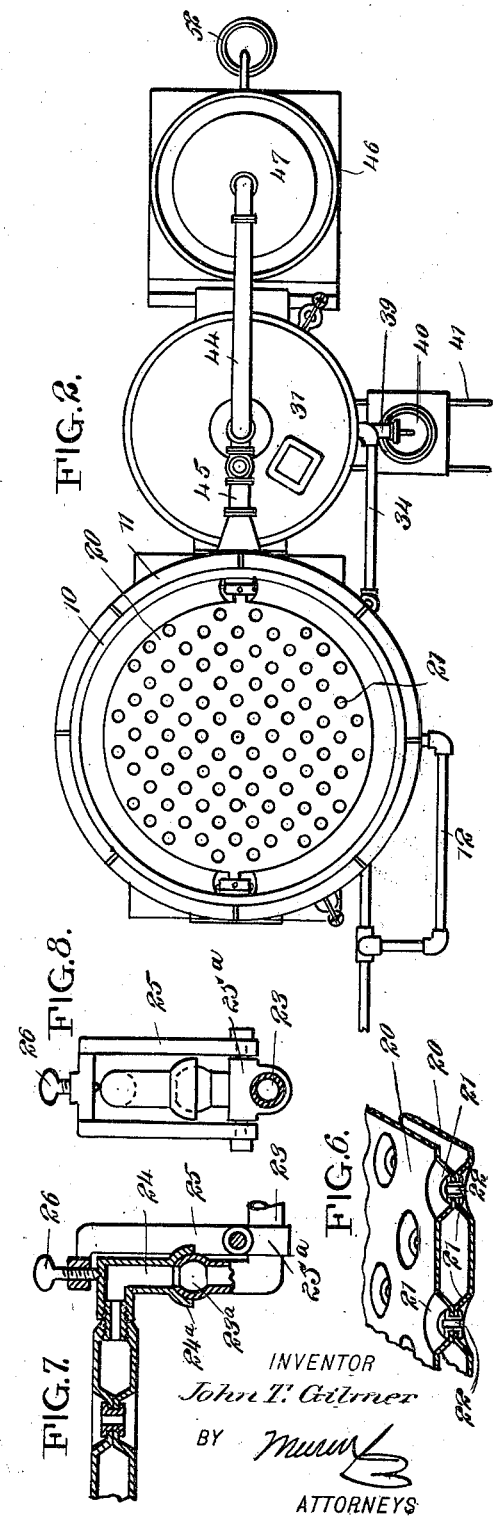
WITNESSES:
INVENTOR
John T. Gilmer
BY
ATTORNEYS

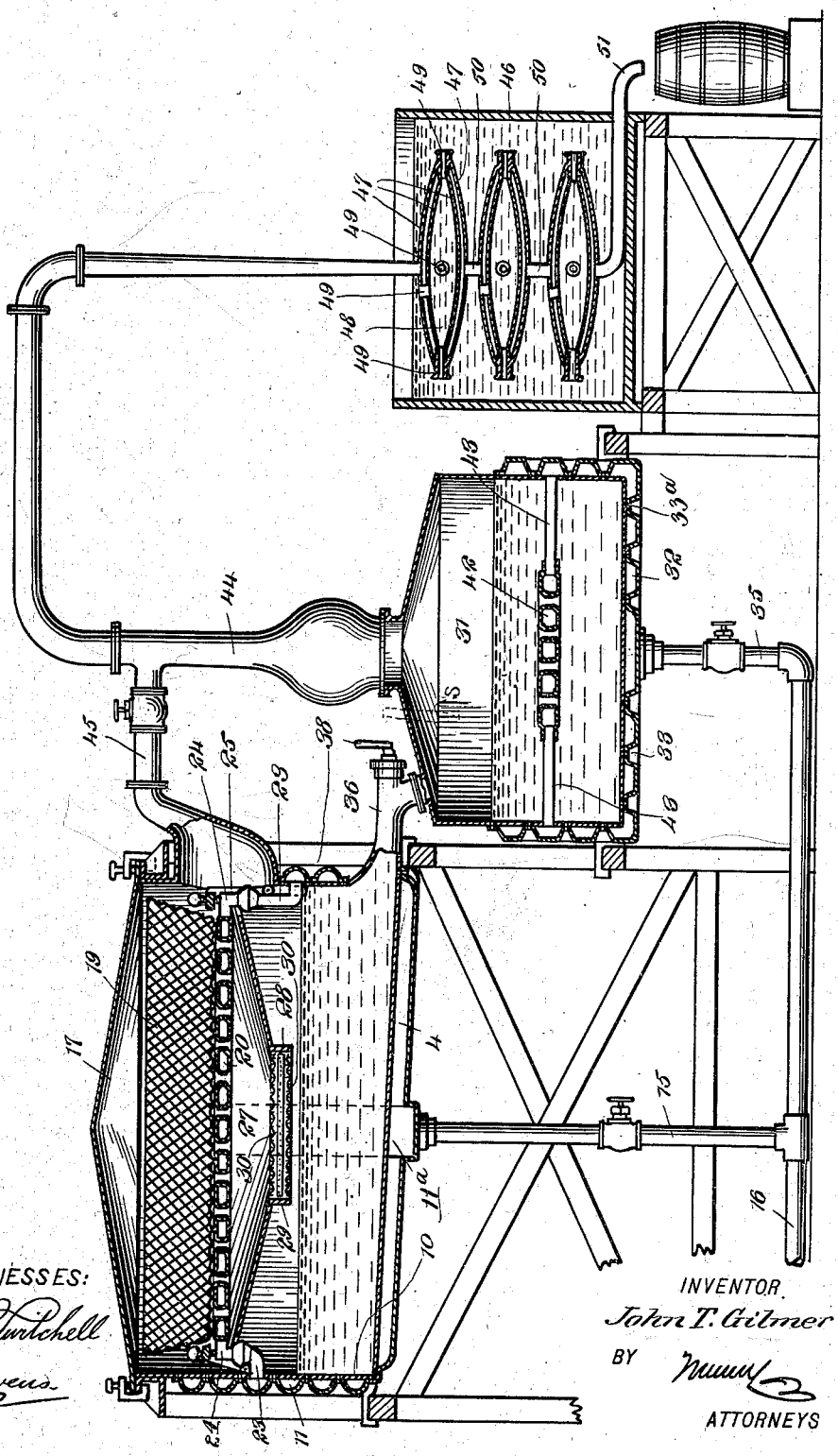

UNITED STATES PATENT OFFICE.

JOHN THORNTON GILMER, OF MOBILE, ALABAMA.

TURPENTINE-STILL.

SPECIFICATION forming part of Letters Patent No. 709,315, dated September 16, 1902.

Application filed June 26, 1901. Serial No. 66,139. (No model.)

*To all whom it may concern:*

Be it known that I, JOHN THORNTON GILMER, a citizen of the United States, and a resident of Mobile, in the county of Mobile and State of Alabama, have invented a new and Improved Turpentine-Still, of which the following is a full, clear, and exact description.

This invention relates to an apparatus for the manufacture of rosin, turpentine, and like products.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side elevation of the apparatus. Fig. 2 is a plan view thereof. Fig. 3 is an enlarged sectional view thereof. Fig. 4 is a detail section showing the manner of forming the side walls of the rosin-vat. Fig. 5 is a sectional perspective view showing the manner of forming the side walls of the still. Fig. 6 is a sectional perspective view showing the manner of forming a heating-blanket or strainer. Figs. 7 and 8 are detail views showing the manner of fastening the steam-pipes to the blanket or strainer shown in Fig. 6, and Fig. 9 is a view of the gate for commanding the outflow of the rosin.

The rosin vat or kettle comprises an inner wall 10, around which is placed a corrugated jacket 11, the detail arrangement of which is best shown in Fig. 4. This corrugated jacket forms a steam-space around the kettle or vat and is provided with a steam-box $11^a$, running down one side and under the bottom of the vat, to which box steam is led by a pipe 12 from a suitable boiler 14 or other source of steam generation. This box serves to distribute the steam throughout the corrugated jacket, whereby to heat the vat. The vapor and water of condensation are led by a pipe 15, passing from the lower part of the box $11^a$, back to the boiler by way of a return-pipe 16. The vat is fitted with a suitable removable cover 17 and also with a safety-valve 18 of any approved form. Within the upper part of the vat is a removable strainer-basket 19, of woven wire or other analogous material, in which the crude gum is placed. This basket is sustained by a perforate heat-rack or "blanket," which is formed of two parallel plates 20, (see Fig. 6,) having indentations 21 and connected together by thimbles 22, located at the said indentations. These thimbles not only fasten the plates together and produce a rigid structure, but also form passages through the blanket. The blanket is suitably sustained from the walls of the vat 10 and has a space between the plates 20 supplied with steam by means of pipes 23, communicating with the steam-space around the vat or kettle 10. The blanket or heater-rack is provided to apply the first heat to the gum, while the thimbles allow the gum to run through the blanket. The pipes 23 are joined to the pipes 24, passing from the blanket, by means of ball-shaped extensions $23^a$, fitted in sockets $24^a$. (See Figs. 7 and 8.) Said pipes are held together by a stirrup 25, which connects the pipes 23 and 24 and is fastened in operative position by a thumb-screw or other analogous device 26. The stirrup is pivoted to the pipe 23 through the medium of pins on a collar $25^a$ on said pipe, so that the stirrup may upon loosening the screw 26 be thrown sidewise to permit the disconnection of the pipes 23 and 24 and the removal of the blanket, if desired.

The crude gum placed in the basket 19 is heated by the steam within the blanket, and as it melts it passes through the blanket down into a funnel-shaped partition 27, arranged in and suitably sustained by the walls of the vat 10 and having its discharge portion or mouth 28 provided with a filter formed of cotton-batting or other absorbent material 29, at the top and bottom of which are woven-wire screens or sieves 30. The gum passing through this filter falls into the bottom of the vat 10 and lies over the same, as indicated in Fig. 3. It is also kept in a liquid state by the action of the steam within the jacket 11.

31 indicates the still, which is surrounded by jacket 32, (see Fig. 6,) having indented portions 33, fastened by rivets $33^a$ or otherwise to the walls of the still. This construction provides a very rigid still and also forms a steam-space for heating the same. Steam from the pipe 12 is delivered to the interior of the jacket 32 by means of a branch pipe 34, and the vapor and water of condensation are carried off from the jacket by means of a pipe 35, leading to the return-pipe 16.

36 indicates the outlet-pipe for carrying the melted gum from the vat 10 into the still 31. This pipe, as best shown in Fig. 9, is commanded by a tubular valve 37, fitted therein and connected with a handle or lever 38, projected outside of the pipe. (See Fig. 9.) By this arrangement effective command of the pipe 36 may be had, and the pipe may be opened or closed quickly by a very easy operation—that is to say, by a half-turn of the lever or handle 38. The rosin is withdrawn from the still through a discharge 39, commanded by a valve similar to that shown in Fig. 9. This discharge 39 may be made to deliver into a barrel or other receptacle, as indicated at 40, and a tramway 41 may be provided for carrying these receptacles into and out of position, so as to facilitate the operations. The steam passing through the jacket 32 properly heats the gum within the still, and for further heating the gum I provide a blanket 42, which is similar in structure to the blanket 20. (See Fig. 6.) This blanket is connected by pipes 43 with the space inclosed by the jacket 32.

Leading from the still 31 is the stem 44, which has communicating therewith a gooseneck 45, passing from the vat 10. This gooseneck carries off from the vat into the stem any vapor which might be generated therein. The stem 44 leads down into the condenser, which may be of any form desired, but preferably comprises a tank 46, in which is contained any desired number of condenser-sections. These sections are made up each of two pairs of concavo-convex disks 47, fastened together so as to form a central water-space (indicated at 48 in Fig. 3) and a marginal vapor-space between the pairs of disks. Leading into said central water-space are a number of pipes or tubes 49, which permit the free circulation of water in and out of the said space, thus sufficiently reducing the temperature in the vapor-spaces and causing the condensation of said vapor. The condenser-sections are connected together by means of pipes 50, and from the lowermost section a discharge-pipe 51 passes out of the tank 46 to deliver the turpentine into a suitable receptacle 52, provided to contain the same.

In the use of the apparatus the crude gum is charged into the basket 19, which serves effectively to strain the gum, holding back any chips and any particles of foreign matter that may exist therein. The heat from the rack or blanket liquidates the gum and causes it to flow through the perforations of the racks into the partition 27 and through the filter 29 30, after which the liquid gum passes into the bottom of the vat 10 and is kept in proper condition by the heat thereof. The gum may be drawn off at will through the pipe 27 into the still, where it is boiled, and the vapors rising therefrom pass through the stem 44 into the condenser. Any vapors that may be formed in the vat 10 are carried off by the gooseneck 49, which communicates with the stem 40 of the still, and thus all of the vapors are carried to the condenser, where they may be drawn off by the pipe 29 in the form of the concentrated product. The construction of the jackets 11 and 32, particularly the latter, provides an extremely rigid structure, in addition to providing a steam-space around the vat. By indenting or "bossing in" and riveting them to the walls of the vat a ribbed structure is secured, and yet sufficient space is allowed between the parts for the free circulation of steam. The same is true of the construction of the blanket 20. This not only produces a perforated steam-heated rack, but it enables such a device to be constructed very cheaply and in the most durable and rigid manner. The basket 12 may be removed from time to time to clean it of the matter retained therein, and the steam heater-rack or blanket may also be removed at will by the device described.

By this apparatus the manufacture of rosin and spirits of turpentine may be carried on in a most economical and effective manner.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. A turpentine-still having a gum-vat, means for heating the vat, a strainer in the upper part of the vat, a funnel-like partition arranged below the strainer, and a filter in the mouth of said funnel-like partition, the filter being formed of an absorbent material sandwiched between screens or sieves.

2. The combination of a vat, means for exteriorly heating the same, a horizontal heater-rack or blanket sustained in the vat, and comprising upper and lower plates spaced apart and having registering perforations and thimbles secured in the perforations, for the purpose specified, a strainer-basket placed over said rack or blanket and a connection between the interior of the heater-rack and the said means for exteriorly heating the vat.

3. The combination of a vat, means for exteriorly heating the same, a perforate, interiorly-chambered heater-rack or blanket sustained in the vat, and a strainer-basket placed over said rack or blanket, and a filter located below the heater-rack or blanket, for the purpose specified.

4. The combination of a vat, means for exteriorly heating the same, a perforate, interiorly-chambered heater-rack or blanket sustained in the vat, a strainer-basket placed over said rack or blanket, a funnel-shaped partition located below the blanket or heater-rack, and filtering devices carried in the mouth of said funnel-shaped partition.

5. The combination of a vat, means for exteriorly heating the same, a perforate, interiorly-chambered heater-rack or blanket sustained in the vat, a strainer-basket placed over said rack or blanket, the said means for exteriorly heating the vat including a steam-jacket, and connections between said steam-jacket and the chambers of the said heater-rack or blanket, the said connections between the steam-jacket and heater-rack including separate pipe-sections and a device for removably holding them engaged.

6. The combination of a vat, means for exteriorly heating the same, a horizontal heater-rack or blanket located in the vat and comprising upper and lower plates spaced apart and having registering perforations, and thimbles secured in the perforations, for the purpose specified, and connections between the said means for exteriorly heating the vat and the interior of the heater-rack or blanket.

7. The combination of a vat, a steam-jacket exteriorly inclosing the same, an interiorly-located, horizontal heater-rack or blanket comprising upper and lower plates spaced apart and having registering perforations, and thimbles secured in the perforations for the purpose specified, and connections between the exterior jacket and the interior of the heater-rack.

8. The combination of a vat, a steam-jacket exteriorly inclosing the same, an interiorly-located, perforate, interiorly-chambered heater-rack or blanket, connections between the exterior jacket and the chamber of the heater-rack, the said connections including two separable pipe-sections, and means for removably holding them engaged.

9. The combination of a vat, means for heating the same, an imperforate partition located therein and having an essentially central passage through it, and a filter held in said passage of the partition and comprising a mass of absorbent material sandwiched between screens or sieves.

10. The herein-described heater-rack or blanket, comprising essentially parallel plates, each plate having portions indented toward the other, said indented portions registering with each other, and thimbles connecting the indented portions together and also forming passages through the rack or blanket.

11. The herein-described heater-rack or blanket, comprising two essentially parallel plates, one of said plates having portions indented toward the other, and thimbles extending through the said indented portions and through the other plate securely to connect said plates together, the thimbles being tubular to serve also to form passages through the rack or blanket.

12. The combination of a vat, a jacket surrounding the outer walls of the vat, said jacket having portions extended toward the walls of the vat, and fastening devices rigidly connecting the indented portions of the jacket and the walls of the vat together, whereby to form a chamber between the jacket and vat and also to produce a rigid structure.

13. The combination of a vat, a jacket extending around the outer walls thereof, said jacket having a plurality of indented portions projected toward the vat, and fastening devices located in the indented portions of the jacket rigidly to connect said portions with the walls of the vat, the indented portions being removed from each other to permit the free circulation of fluid in all directions around the said fastening devices, for the purpose specified.

14. An apparatus for the manufacture of naval stores, comprising a vat, means for exteriorly heating the same, means for interiorly heating the vat, a strainer-basket located in the vat above said means for interiorly heating the same, a filter located in the vat below said means for interiorly heating the vat, a still, a means establishing communication between the vat and still, means for heating the still, and a condenser connected with the still.

15. An apparatus for the manufacture of naval stores, comprising a vat, means for exteriorly heating the same, means for interiorly heating the vat, a strainer-basket located in the vat above said means for interiorly heating the same, a filter located in the vat below said means for interiorly heating the vat, a still, a means establishing communication between the vat and still, means for heating the still, the said means for heating the still comprising an exterior steam-chamber, an exteriorly-located interiorly-chambered heater-rack, and connections between the heater-rack and the steam-chamber.

In testimony whereof I have signed my name to this specification in the presence of two subscribing witnesses.

JOHN THORNTON GILMER.

Witnesses:
L. K. IRWIN,
RICHARD W. STOUTZ.